UNITED STATES PATENT OFFICE.

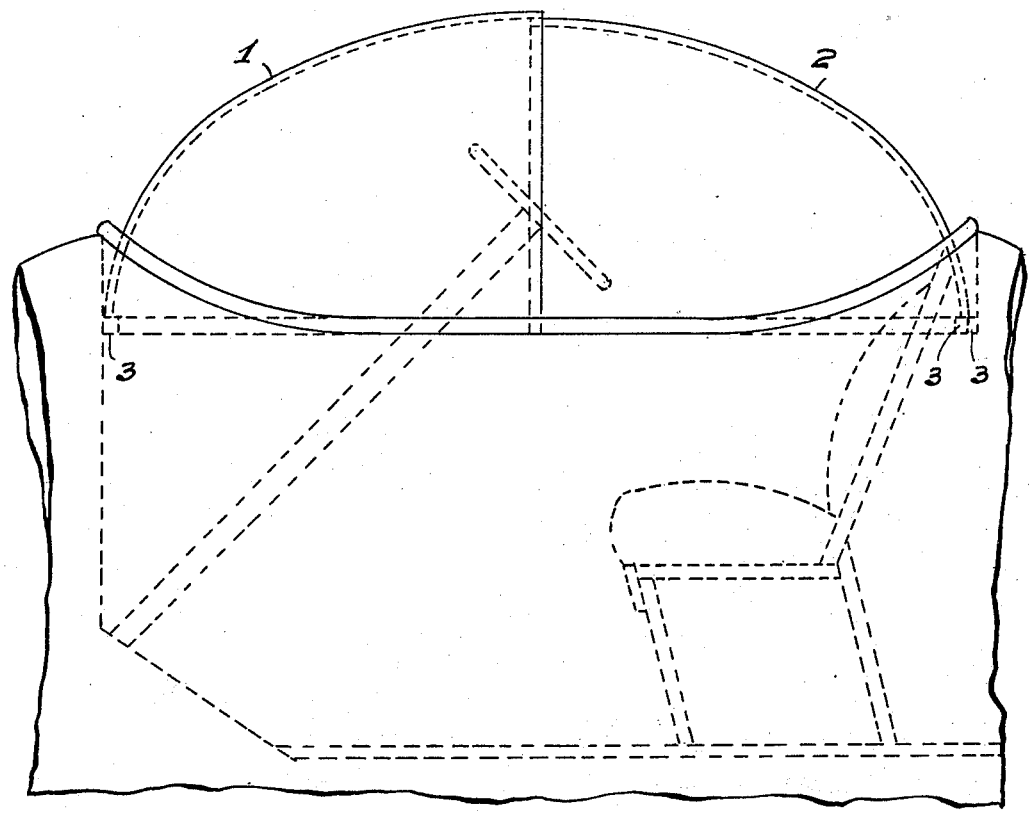

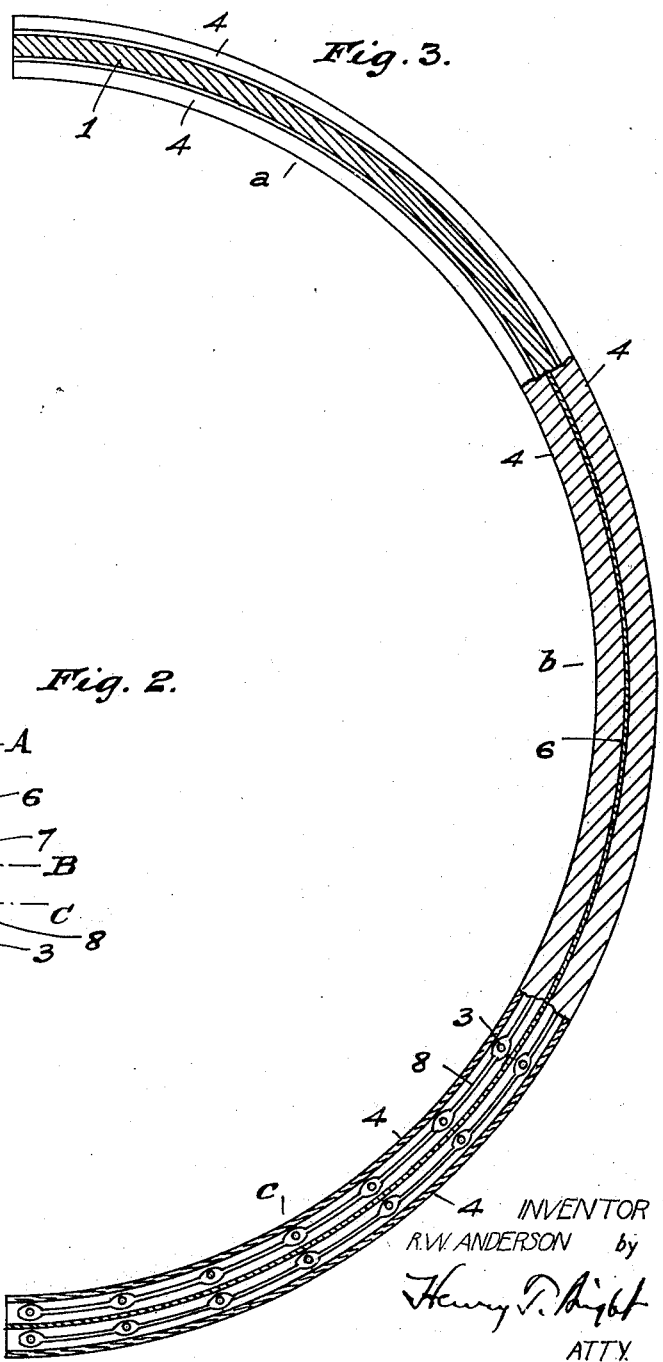

ROBERT WILLIAM ANDERSON, OF LIVERPOOL, ENGLAND.

WEATHER SCREEN OR HOOD FOR MOTOR-CARS.

1,393,734.  Specification of Letters Patent.  Patented Oct. 18, 1921.

Application filed February 18, 1920. Serial No. 359,587.

*To all whom it may concern:*

Be it known that I, ROBERT WILLIAM ANDERSON, a subject of the King of Great Britain, and a resident of Liverpool, England, have invented certain new and useful Improvements in Weather Screens or Hoods for Motor-Cars, of which the following is a specification.

This invention relates to improvements in protective hoods or screens for the drivers of motor cars and consists of an arrangement such that the driver or occupant of the car may be completely inclosed, if desired, to protect him from the weather, or the hood may be open.

According to this invention, the protective hood or screw is made circular in plan, and may be either a part of a sphere, cylinder, or of flattened spherical shape. The hood is made in two or more parts which are adapted, when opened, to slide circularly one within the other and thus occupy a minimum space so as to leave the seating position of the driver and occupant as open as possible when required, the parts being capable of being opened out so as to extend completely around the driver and the occupant. For this purpose, the lower part of the circular frames may be mounted to run in ball races.

The invention is illustrated in the accompanying drawings in which Figure 1. is a side fragmentary view of the body of a motor car showing the preferred construction of the weather screen, Fig. 2. being a fragmentary vertical section of the foot of the screen and the ball race, Fig. 3. being a fragmentary half plan to a larger scale than Fig. 1, the part *a* being a section on the line A—A, the part *b*, a section on the line B—B, and the part *c*, a section on the line C—C, all of Fig. 2.

In the preferred construction, the hood parts consists of two frames 1, 2, semi-circular in plan which are glazed and of flattened spheroidal form. The two parts of the hood conform in shape to the quarter of a flattened spheroid, and owing to their circular shape in plan and the ball race fittings 3 at their lower circular edges, they may be slid around so as to overlap, the space for the driver then being only half inclosed, or by expanding the parts as shown in Fig. 1. they may be arranged completely to inclose the driver's space in a sort of glazed cupola which, owing to its flattened spherical form offers very little resistance to the wind, and at the same time offers a complete protection for the driver against the weather, when opened out, and even when folded together so as to overlap a very effective front hood is obtained. The glazed half domes 1, 2, are carried in a two part casing 4 which runs upon the ball races 3 and upon a lower frame 5 to receive the balls. Secured to this lower frame 5 is a retaining member 6 having undercut surfaces 7 which engage correspondingly shaped faces on the casing 4 so as to retain it against lifting and keep the ball race elements in engagement. Each of the half domes 1, 2, has a similar ball race fitting, the one of slightly smaller diameter than the other so that the smaller half dome screen 2 may be run around and fit within the larger half dome screen 1. Similarly, the half dome screen 1 may be adjusted at any angular position around the race and thus the screen set to protect the driver against a side wind or side rain drive coming from any direction, while by causing the two dome screens partially to overlap any degree of protection may be provided. In order to prevent the balls locking they may be carried in a distancing frame 8 of known type and as illustrated in Fig. 3.

Provision may be made for ventilating the interior of the cupola other than the ventilation which would be provided by the slight clearance between the half dome screens.

A further advantage of this arrangement lies in the fact that, should the front glazed screen become obscured while driving by snow or rain, it may be rotated to the rear, leaving the clean inner screen as a front protection to the driver, while the rear screen is being cleaned.

The sweep of the glazed screen is preferably such that when in their completely inclosed positions they overlap, say, to the extent of an inch or thereabout. Instead of being spheroidal the sections of the screens may be made cylindrical, with flat tops.

I claim:

A hood of the character described comprising a pair of substantially quarter-spherical shaped sections mounted for sliding movement and being receivable one within the other by relative rotation of said sections, a frame supporting said sections, a two part casing carried at the lower edge of one of said sections, said casing having undercut faces, a retaining member secured to the frame and projecting between the parts of said casing and including undercut faces engageable with the corresponding undercut faces of the casing to anchor said section and frame together, and antifriction bearing devices arranged to either side of said retaining member and between the frame and section to receive the weight of the latter.

In testimony whereof I affix my signature in presence of two witnesses.

ROBERT WILLIAM ANDERSON.

Witnesses:
    E. Heginbotham,
    A. J. Decies.